(12) United States Patent
Sugiyama et al.

(10) Patent No.: US 10,890,312 B2
(45) Date of Patent: Jan. 12, 2021

(54) DISPLAY DEVICE INCLUDING PROTRUDING PLATE

(71) Applicant: Panasonic Intellectual Property Management Co., Ltd., Osaka (JP)

(72) Inventors: Tomonori Sugiyama, Osaka (JP); Kazuhiko Kaneuchi, Osaka (JP); Hideaki Nakagawa, Osaka (JP); Masaki Kontani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 10 days.

(21) Appl. No.: 16/286,534

(22) Filed: Feb. 26, 2019

(65) Prior Publication Data

US 2019/0390839 A1   Dec. 26, 2019

(30) Foreign Application Priority Data

Jun. 26, 2018   (JP) .................................. 2018-121090

(51) Int. Cl.
*F21V 3/10*   (2018.01)
*G09F 13/22*   (2006.01)
(Continued)

(52) U.S. Cl.
CPC ................ *F21V 3/10* (2018.02); *B32B 21/14* (2013.01); *B32B 27/00* (2013.01); *F21V 3/02* (2013.01);
(Continued)

(58) Field of Classification Search
CPC ... G02F 1/134309; G02F 2001/133357; G02F 2202/28; G02F 2203/01; G02F 1/133514;
(Continued)

(56) References Cited

U.S. PATENT DOCUMENTS

| 8,018,645 B2* | 9/2011 | Omote ............. G02F 1/133308 |
| | | 359/320 |
| 8,379,160 B2* | 2/2013 | Takenaka ............ G02F 1/13476 |
| | | 349/33 |

(Continued)

FOREIGN PATENT DOCUMENTS

JP   2001-341106   12/2001

OTHER PUBLICATIONS

Extended European Search Report issued in corresponding European Patent Application No. 19162463.4, dated May 20, 2019.

*Primary Examiner* — Dismery Mercedes
(74) *Attorney, Agent, or Firm* — McDermott Will & Emery LLP

(57) ABSTRACT

A display device including a protruding-plate includes the protruding-plate, a thin-film-layer, a transparent-base-material, a first-concealing-layer, a light-diffusion-layer, a light-color-toning-layer, and a second-concealing-layer. The first-concealing-layer is disposed closer to the protruding-plate than the second-concealing-layer and the light-color-toning-layer to the protruding-plate. The protruding-plate, the transparent-base-material, the thin-film-layer, and the second-concealing-layer include a greater thickness in this order. The second-concealing-layer, the first-concealing-layer, and the light-diffusion-layer have a same thickness. The light-diffusion-layer is thicker than the light-color-toning-layer. The transparent-base-material and the thin-film-layer have a same light transmittance. The thin-film-layer, the protruding-plate, the light-diffusion-layer, the light-color-toning-layer, the first-concealing-layer, and the second-concealing-layer have a higher light transmittance in this order.

13 Claims, 5 Drawing Sheets

(51) Int. Cl.
*G06F 3/041* (2006.01)
*G02F 1/1335* (2006.01)
*B32B 27/00* (2006.01)
*F21V 3/02* (2006.01)
*F21V 13/12* (2006.01)
*G09F 13/08* (2006.01)
*G02F 1/1333* (2006.01)
*B32B 21/14* (2006.01)
*G02F 1/13357* (2006.01)
*F21Y 115/10* (2016.01)
*F21W 121/00* (2006.01)

(52) U.S. Cl.
CPC .......... *F21V 13/12* (2013.01); *G02F 1/1333* (2013.01); *G02F 1/133504* (2013.01); *G02F 1/133512* (2013.01); *G02F 1/133524* (2013.01); *G02F 1/133606* (2013.01); *G06F 3/041* (2013.01); *G09F 13/08* (2013.01); *G09F 13/22* (2013.01); *B32B 2457/20* (2013.01); *F21W 2121/00* (2013.01); *F21Y 2115/10* (2016.08); *G09F 2013/222* (2013.01)

(58) Field of Classification Search
CPC ......... G02F 1/133512; G02F 1/133606; G02F 1/133608; G02F 1/13338; G02F 1/1333; G02F 1/133305; G09F 9/00; G09F 13/08; G09F 13/22; G09F 2013/222; G09F 13/20; G09F 2005/043; G09F 2013/1854; G09F 19/12; G09F 19/22; B32B 2250/05; B32B 2255/08; B32B 2307/4026; B32B 2307/412; B32B 7/12; B32B 27/00; B32B 21/04; B32B 2451/00; B32B 2307/402; B32B 2457/20; F21V 3/02; F21V 3/10; G06F 3/041; G06F 2203/04103; B60K 2370/1438; B60K 2370/152

See application file for complete search history.

(56) References Cited

U.S. PATENT DOCUMENTS

| | | | | |
|---|---|---|---|---|
| 8,446,671 | B2* | 5/2013 | Omata | G04C 10/02 359/485.01 |
| 8,477,414 | B2* | 7/2013 | Suzuki | C03C 17/3613 359/360 |
| 10,185,171 | B2* | 1/2019 | Ochi | B29D 11/00788 |
| 10,696,218 | B1* | 6/2020 | Kontani | F21V 7/00 |
| 2002/0031620 | A1* | 3/2002 | Yuzawa | B32B 21/08 428/1.1 |
| 2011/0311787 | A1* | 12/2011 | Akesson | B32B 3/10 428/195.1 |
| 2015/0331280 | A1* | 11/2015 | Wakabayashi | G02F 1/1339 349/57 |
| 2015/0362770 | A1* | 12/2015 | Yang | G02F 1/1333 349/42 |
| 2016/0037608 | A1* | 2/2016 | Ikeda | H01L 27/3293 362/235 |
| 2017/0184273 | A1* | 6/2017 | Tateda | F21V 11/14 |
| 2018/0017829 | A1* | 1/2018 | Chae | G02F 1/133512 |
| 2019/0063722 | A1* | 2/2019 | Sugiyama | B60Q 3/54 |
| 2019/0243045 | A1* | 8/2019 | Inada | G03F 7/0007 |
| 2020/0058888 | A1* | 2/2020 | Sugiyama | H01L 51/502 |

* cited by examiner ic field of an exterior of a household electric appliance, an interior of an automobile, or the like, with diversification of customer orientation and recent genuine orientation, and high quality orientation, wide range of design expressions and high-quality designability needs have been increased. Among them, as one of the decorating methods expressing a high-quality feeling, there is a need for a method having a high designability by combining a protruding plate of natural wood with light. Here, the term of the protruding plate means a sheet-like plate material which is obtained by thinly slicing a wood material.

DISPLAY DEVICE INCLUDING PROTRUDING PLATE

BACKGROUND

1. Technical Field the present disclosure relates to a display device having a decorating technique with lighting including a protruding plate.

2. Description of the Related Art

In recent years, in a decorating method of a surface of an exterior component, a panel, or the like in a field of an exterior of a household electric appliance, an interior of an automobile, or the like, with diversification of customer orientation and recent genuine orientation, and high quality orientation, wide range of design expressions and high-quality designability needs have been increased. Among them, as one of the decorating methods expressing a high-quality feeling, there is a need for a method having a high designability by combining a protruding plate of natural wood with light. Here, the term of the protruding plate means a sheet-like plate material which is obtained by thinly slicing a wood material.

As the decorating method using the protruding plate, in addition to a method of expressing an appearance with a wood material by sticking the protruding plate itself to a casing, a method of embossing a wood grain of the protruding plate or a picture such as a character or a pattern provided on a back surface of the protruding plate by light transmitting the protruding plate by providing a light source on the back surface of the protruding plate is generally known. Particularly, with respect to the latter, it is possible to express higher designability.

A wood decorative molded article, in which an integrated base material bonded on a back surface of the protruding plate is provided and a design layer is disposed on the back surface thereof, is disclosed in Japanese Patent Unexamined Publication No. 2001-341106. The configuration is illustrated in FIG. 4.

Wood decorative molded article 101 of FIG. 4 is constituted of protruding plate 102, base material 103, design layer 105, and a top coat paint film layer which is omitted in FIG. 4 and is provided on a surface of protruding plate 102. Since protruding plate 102 is formed to be as thin as substantially 2 mm in thickness, protruding plate 102 has a certain degree of transparency and base material 103 having transparency by injection molding is bonded and integrated on a back surface of protruding plate 102. Design layer 105 can be provided on either a front surface side or a back surface side of base material 103. Although not illustrated, a display material for displaying predetermined information can be provided on the back surface of the wood decorative molded article, a light source for illumination, or the surface of protruding plate 102.

In the wood decorative molded article, since protruding plate 102 and base material 103 have transparency, design layer 105 appears through the surface in a transparent manner and is viewed to be complex with protruding plate 102, so that it is possible to change the design of protruding plate 102. Design of design layer 105 can be optionally selected, such as colored, patterned, or texted, and designability can be freely changed. It is also possible to change a color tone or brightness of the protruding plate by combining with the light source. Furthermore, in a case where the display material is provided on the surface of protruding plate 102, the light source provided on the back surface of the wood decorative molded article is turned on, so that information displayed thereon can be confirmed even in a dark place.

SUMMARY

According to an exemplary embodiment of the present disclosure, there is provided a display device including a protruding plate, including the protruding plate, a thin film layer, a transparent base material, a first concealing layer, a light diffusion layer, a light color toning layer, and a second concealing layer.

The protruding plate has a first surface and a second surface on a side opposite to the first surface, and is made of natural wood.

The thin film layer is disposed on the first surface of the protruding plate.

The transparent base material, the first concealing layer, the light diffusion layer, the light color toning layer, and the second concealing layer are disposed on a side of the second surface of the protruding plate.

The first concealing layer has a dispositional relationship in which the first concealing layer is disposed closer to the protruding plate than the second concealing layer and the light color toning layer to the protruding plate.

The transparent base material, the first concealing layer, the light diffusion layer, the light color toning layer, and the second concealing layer are disposed in an arbitrary order except for the dispositional relationship.

The protruding plate, the transparent base material, the thin film layer, and the second concealing layer include a greater thickness in this order.

The second concealing layer, the first concealing layer, and the light diffusion layer have a same thickness.

The light diffusion layer is thicker than the light color toning layer.

In light transmittance measured when light from a light source is radiated from the side of the second surface to a side of the first surface of the protruding plate, the transparent base material and the thin film layer have a same light transmittance. The thin film layer, the protruding plate, the light diffusion layer, the light color toning layer, the first concealing layer, and the second concealing layer have a higher light transmittance in this order.

DETAILED DESCRIPTIONS

In the related art, when the light source is turned off, only the wood grain or the color tone of the protruding plate itself can be visually recognized. Therefore, when the light source is turned on, it is difficult to produce a light expression with excellent designability, in which light indicating an arbitrary character, mark, or the like is embossed, on a part of the surface of the protruding plate. In the related art, since protruding plate 102 and base material 103 having transparency are used, the design of design layer 105 is displayed on the surface of protruding plate 102 via base material 103. Therefore, even when the light source is turned off, an arbitrary design of design layer 105 can be viewed through on the surface of the protruding plate. Furthermore, in a case where there is an arbitrary character or a mark portion to be displayed by transmitting light only when the light source is turned on, apart from display, it is necessary to provide a concealing layer with high concealing property, for example, a layer constituted of black ink or the like with many pigment components. However, in the related art, since the color tone itself is color-transparent on the surface of protruding plate 102, the color tone of protruding plate 102 itself becomes dark.

A color-transparent problem of the layer provided on the back surface of the protruding plate which is described above is considered to be solved by further adding the layer between protruding plate 102 and base material 103. However, in addition to a light diffusion property of the added layer, since the protruding plate itself of natural wood has numerous voids, the light tends to be diffused. In other words, when an arbitrary character or mark is displayed on the surface of the protruding plate, there is also a problem that an outline portion thereof is blurred and unclearly displayed. Such a problem can be a fatal problem in a field in which a line width used for an in-vehicle base material or the like is small and clear display is required. Therefore, in the design expression based on the combination of the protruding plate and the light when the light source is turned on, it is very important to appropriately select a layer configuration of the back surface of the protruding plate.

Hereinafter, Exemplary embodiments of the present disclosure will be described with reference to the drawings.

Exemplary Embodiment 1

Figure 1A:
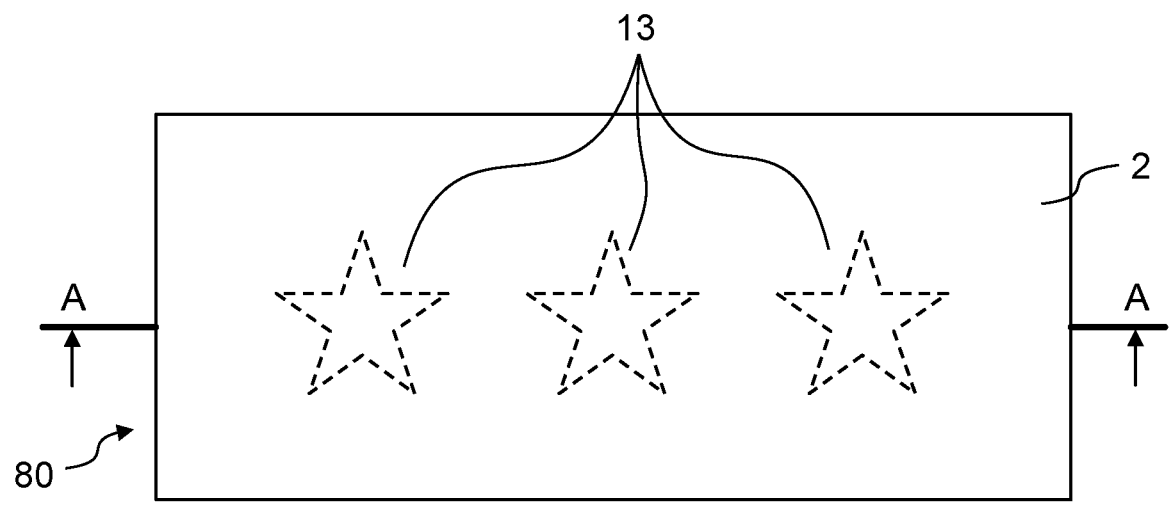
FIG. 1A is a front view of a display device including a resin component in Exemplary embodiment 1.
Figure 1B:
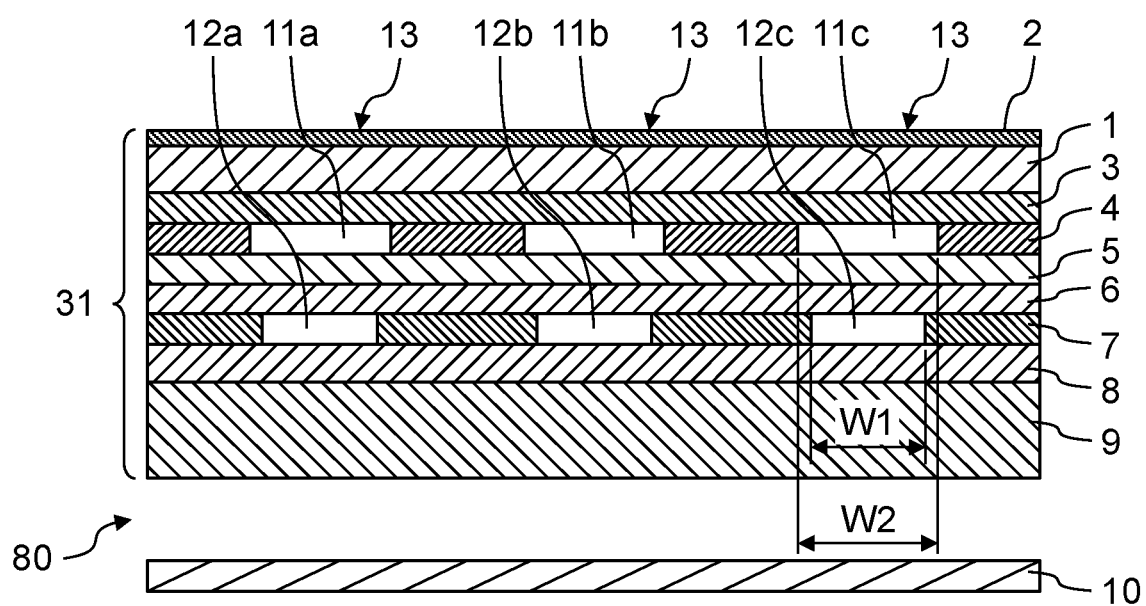
FIG. 1B is a sectional view that is taken along line A-A of FIG. 1A of the display device including the resin component in Exemplary embodiment 1.

FIGS. 1A and 1B illustrate display device 80 including protruding plate 1 of Exemplary embodiment 1 of the present disclosure.

Display device 80 is constituted of resin component 31 having protruding plate 1 as a constitutional requirement and light source 10 for backlight.

Resin component 31 includes at least protruding plate 1, thin film layer 2, transparent base material 3, first concealing layer (metallic concealing layer 4), light diffusion layer 5, light color toning layer 6, and second concealing layer 7. Resin component 31 is constituted as follows.

Protruding plate 1 refers to a sheet-like plate material obtained by thinly slicing a wood material and is constituted of, for example, natural wood. Thin film layer 2 is formed on a surface (that is, a first surface) that is one surface of protruding plate 1.

A plurality of members are disposed on a back surface (that is, a second surface) that is the other surface of protruding plate 1. For example, transparent base material 3 is formed on the back surface that is the other surface of protruding plate 1. For example, metallic concealing layer 4 as the first concealing layer, light diffusion layer 5, light color toning layer 6, and second concealing layer 7 are formed in order on the back surface of transparent base material 3. Furthermore, reinforcing layer 9 is bonded to the back surface of second concealing layer 7 via adhesive layer 8.

The order of constitution of each member on the back surface of protruding plate 1 is not limited to the order described above but may be any. However, metallic concealing layer 4 is provided closer to a protruding plate 1 side than light color toning layer 6 and second concealing layer 7.

The surface of protruding plate 1 is made of natural wood, protruding plate 1 is a sheet-like sliced plate material of which a light transmissivity is 5% or more and 30% or less, and a plate thickness is 0.1 mm or more and 0.6 mm or less. The surface thereof has irregularities derived from wood itself. If the plate thickness of protruding plate 1 is less than 0.1 mm, it is too thin causing to be easily broken and handling is difficult. On the other hand, if the plate thickness exceeds 0.6 mm, it is too thick causing light to be difficult to pass through. Although it depends on a use, for example, an organic resin having a molecular weight of 100 or more and 50,000 or less as a molecular weight range of commonly used resin, for example, polyethylene glycol, phenol resin, or the like is impregnated into an inside of protruding plate 1. Impregnation treatment improves a mechanical strength of protruding plate 1 and further enhances the light transmittance of the projecting plate 1 itself as compared with before the impregnation to improve the transparency of protruding plate 1 itself. Therefore, the light-transmitting property can be enhanced. In addition to the organic resin, optional addition of a pigment, a phosphorescent paint, a dye, a flame retardant, or the like to protruding plate 1 can improve an appearance or functionality of protruding plate 1 together with the mechanical strength. Not only a sheet of natural wood but also sheets of a plurality of natural woods, for example, is laminated on "protruding plate" 1, and a processed sheet-like wood board which is sliced to a plate thickness of 0.1 mm or more and 0.6 mm or less is also included.

Thin film layer 2 has a film thickness of 5 μm or more and 50 μm or less and is formed on the surface (first surface) of protruding plate 1. A layer configuration of thin film layer 2 is one layer or two layers and can be changed according to a reliability standard of a target product. In this case, a minimum thickness is 5 μm. Thin film layer 2 has transparency and the color tone or the wood grain of protruding plate 1 appears on the surface of thin film layer 2. A typical thick film clear coat has a thickness exceeding 50 μm. Therefore, the protruding plate, on which the thick film clear coat is formed, feels a sense of depth. On the other hand, since thin film layer 2 has a film thicknesses of 5 μm or more and 50 μm or less, a distance between the surface of thin film layer 2 and protruding plate 1 becomes short and a texture of the protruding plate itself can be felt.

In addition, arbitrary irregularities can be imparted to the surface of thin film layer 2 by mold embossing, an embossed plate, and an embossed film, by adding a filler, or the like.

Therefore, it is possible to freely change the appearance, tactile sensation, glossiness, or the like of the surface.

Transparent base material 3 has a film thicknesses of 20 μm or more and 200 μm or less, and is formed of, for example, a light transmissive material such as polycarbonate resin or acrylic resin. Protruding plate 1 is reinforced and becomes strong against cracking, bending, or the like by forming transparent base material 3 on a back surface side of protruding plate 1. If the film thicknesses of transparent base material 3 is less than 20 μm, it is too thin causing handling to be difficult, whereas if the film thicknesses exceeds 200 μm, when the film is stuck on protruding plate 1, it is too thick and protruding plate 1 is easily curled and handling is difficult.

Metallic concealing layer 4 (first concealing layer) has light transmitting portions 11a, 11b, and 11c (first light transmitting portion) of shape 13 of an arbitrary character, mark, or pattern on a part of the layer. Positions and shapes of light transmitting portions 11a, 11b, and 11c are substantially coincident with positions and shapes of light transmitting portions 12a, 12b, and 12c (second light transmitting portion) of second concealing layer 7 as viewed from the surface of protruding plate 1 on thin film layer 2 side. Here, outer peripheries of outlines of light transmitting portions 11a, 11b, and 11c are formed larger than those of light transmitting portions 12a, 12b, and 12c of second concealing layer 7. That is, centers of light transmitting portion 11a and light transmitting portion 12a are coincident with each other as viewed from the surface of protruding plate 1 on thin film layer 2 side. Centers of light transmitting portion 11b and light transmitting portion 12b are coincident with each other. Centers of light transmitting portion 11c and light transmitting portion 12c are coincident with each other. The outer periphery of light transmitting portion 11a is larger than the outer periphery of light transmitting portion 12a. The outer periphery of light transmitting portion 11b is larger than the outer periphery of light transmitting portion 12b. The outer periphery of light transmitting portion 11c is larger than the outer periphery of light transmitting portion 12c. Specifically, assuming that respective widths of light transmitting portions 12a, 12b, and 12c of second concealing layer 7 are W1, and respective widths of light transmitting portions 11a, 11b, and 11c of metallic concealing layer 4 are W2, it satisfies W1×1.1≤W2≤W1×2.0. Therefore, when light is emitted from light source 10, the light transmitted through light transmitting portions 12a, 12b, and 12c of second concealing layer 7 can transmit light transmitting portions 11a, 11b, and 11c of metallic concealing layer 4 without shifting the positions thereof. In addition, an area of light transmitting portions 11a, 11b, and 11c of metallic concealing layer 4 in a plane parallel to a display surface is considerably smaller than that of a portion without light transmitting portions 11a, 11b, and 11c, and the light is reflected and scattered by a filler contained in metallic concealing layer 4. Therefore, it is possible to suppress a phenomenon that the layer on the back surface of metallic concealing layer 4 is color-transparent on the surface of protruding plate 1 and the color tone of protruding plate 1 becomes dark. Therefore, for example, even in a case where a dark color tone is used for second concealing layer 7, an original color tone of protruding plate 1 itself can be maintained without reducing the original color tone.

Light diffusion layer 5 has an effect of uniformly diffusing the light emitted from light source 10 and transmitting the light. Therefore, even in a case where a light source that emits a point light such as a Light Emitting Diode (LED) is used as light source 10, regardless of a size of a distance from the light source, shape 13 of an arbitrary character, mark, or pattern, which is uniformly emitted light on the surface of protruding plate, 1 can be visually recognized.

Each thickness of second concealing layer 7, metallic concealing layer 4, and light diffusion layer 5 is 3.5 μm or more. Each thickness of second concealing layer 7 and metallic concealing layer 4 is set to 3.5 μm or more, so that it is possible to enhance the concealing property. In addition, the thickness of light diffusion layer 5 is set to 3.5 μm or more, so that an incident light is diffused more uniformly in the layer.

Light color toning layer 6 is made of a material that transmits light, for example, a process ink, a color film, or the like. When light is emitted from light source 10, not only a color of warm color-based light derived from the protruding plate but also an arbitrary color of light desired by a user can be expressed on the surface of the protruding plate by providing light color toning layer 6 between protruding plate 1 and light source 10. For example, in a case where the white light source LED is used as light source 10 with respect to white-based protruding plate 1, in a case where the white light is desired to be expressed on the surface of the protruding plate, in the chromaticity values in the X and Y chromaticity diagram of light color toning layer 6, X is set to 0.2800 or more and less than 0.3300, and Y is set to 0.2800 or more and less than 0.3300. In addition, in a case where the blue light is desired to be expressed on the surface of the protruding plate, in chromaticity values X and Y of light color toning layer 6, X is set to 0.1700 or more and less than 0.2300, and Y is set to 0.0190 or more and less than 0.2310. In addition, in a case where the green light is desired to be expressed on the surface of the protruding plate, in chromaticity values X and Y of light color toning layer 6, X is set to 0.1290 or more and less than 0.3510, and Y is set to 0.4970 or more and less than 0.6400. In addition, in a case where the red light is desired to be expressed on the surface of the protruding plate, in chromaticity values X and Y of light color toning layer 6, X is set to 0.4800 or more and less than 0.5600, and Y is set to 0.2900 or more and less than 0.3270. With such a configuration, it is possible to control the color of the light that the user desires to express on the surface of the protruding plate and freely express the color of the light by using the chromaticity values. The thickness of light color toning layer 6 is less than 3.5 μm. This is because if the thickness of light color toning layer 6 is increased to 3.5 μm or more, a transmitting amount of light decreases and luminance when the light is visually recognized from the surface decreases.

Similar to metallic concealing layer 4, second concealing layer 7 has light transmitting portions 12a, 12b, and 12c having shape 13 of an arbitrary character, mark, or pattern, and is formed of a light-shielding material that does not transmit light except for light transmitting portions 12a, 12b, and 12c.

Adhesive layer 8 is formed of a light transmissive adhesive material such as an acrylic-based or epoxy-based adhesive.

Reinforcing layer 9 is formed of a light transmissive transparent resin. The color of reinforcing layer 9 can be freely selected by the user as long as it only transmits light. An example of reinforcing layer 9 will be described later.

Light source 10 such as the light emitting diode (LED) is disposed at an arbitrary distance from the reinforcing layer on the surface of reinforcing layer 9 on the side opposite to adhesive layer 8. Light source 10 can easily control a color change or the like by using a light-emitting diode chip having three primary colors of light of blue, red, and green in a single package, thereby expressing full color. As another example of light source 10, it is also possible to use another light source other than the LED as a backlight. Light source 10 can be embedded in the surface of reinforcing layer 9 on adhesive layer 8 side or in an inside of reinforcing layer 9, and can be freely designed according to a situation used by the user. It is also possible to perform finer color matching by combining the color of the light of light source 10 and the color tones of light color toning layer 6 and reinforcing layer 9.

When light source 10 is turned off, only a light reflected from the surface of protruding plate 1 can be visually recognized by the external light by each member configuration of the back surface of protruding plate 1, so that even if it is used for an exterior portion of a household electric appliance, an interior of an automobile, or the like, only a part thereof can be recognized.

Since the organic resin is impregnated into the inside of protruding plate 1 having a plate thickness of 0.1 mm or more and 0.6 mm or less, even in a case of dark color tree species which are usually hard to transmit light, a design using the light transmission can be expressed. Therefore, when light source 10 is turned on, it is possible to display shape 13 of an arbitrary character, mark, or pattern which uniformly emits light to the color selected by the user on the surface of protruding plate 1 by the light transmission.

A state where reinforcing layer 9 illustrated in FIG. 1B is made of resin by insert molding is illustrated. However, as long as members have both light transmittance and strength such as a resin plate or a glass plate, they may be used. Resin that can be used as the resin material of reinforcing layer 9 is a general-purpose molding resin such as polymethylmethacrylate resin (PMMA resin), acrylonitrile butadiene styrene resin (ABS resin), polystyrene resin (PS resin), or polycarbonate resin (PC resin). In addition thereto, as the resin material of reinforcing layer 9, it is also possible to deal with resin requiring molding at a high temperature, such as resin for optical applications, super engineering resin, or the like. Therefore, display device 80 using the protruding plate can also be used for a lamp cover or the like. Even if the general purpose molding resin such as the PMMA resin, the ABS resin, the PS resin, or the PC resin, resin for the optical use, or the super engineering resin is used for the resin base material of reinforcing layer 9, similar to the above case, when light source 10 is turned off, only the reflected light of protruding plate 1 can be viewed by the external light. When light source 10 is turned on, it is possible to visually recognize shape 13 of an arbitrary character, mark, or pattern which uniformly emits the light to an arbitrary color on the surface of protruding plate 1.

With these configurations, when light source 10 is turned off, that is, in a state where the surface of protruding plate 1 is visually recognized only by the external light, color transparency onto the surface of protruding plate 1 by second concealing layer 7 and light color toning layer 6 is suppressed by metallic concealing layer 4, so that only the color tone or the wood grain derived from protruding plate 1 can be visually recognized.

On the other hand, when light source 10 is turned on, in a state where light is transmitted through the back surface of protruding plate 1 and the surface of protruding plate 1 is visually recognized by the external light, light transmits light transmitting portions 11a, 11b, and 11c of metallic concealing layer 4, and light transmitting portions 12a, 12b, and 12c of second concealing layer 7. Therefore, the light display of an arbitrary character, mark, or pattern having the same shapes as light transmitting portions 11a, 11b, 11c, 12a, 12b, and 12c can be visually recognized on the surface of protruding plate 1. In addition to the display, metallic concealing layer 4 and second concealing layer 7 do not transmit light from the back surface of protruding plate 1, and only the color tone or the wood grain derived from protruding plate 1 can be visually recognized similar to the state where the surface of protruding plate 1 is visually recognized by the external light.

Furthermore, even when the light source is turned off, the color tone of the layer formed on the back surface of the protruding plate is not color-transparent on the surface of the protruding plate and when the light source is turned on, it is possible to display a clear outline with less blurring, and control in an arbitrary manner the color of the transmitted light to be taken out by the layer configuration of the back surface of the protruding plate. That is, it is possible to provide display device 80 using the protruding plate having the decorating technique with a small line width by lighting using the protruding plate, and excellent in the designability of a clear display.

As a result, it is possible to produce light expressions with excellent designability in accordance with turning on and off of light source 10 provided on the back surface of protruding plate 1.

Exemplary Embodiment 2

FIGS. 2A, 2B, 2C, and 2D illustrate display device 81 including resin component 31 of Exemplary embodiment 2 of the present disclosure.

In Exemplary embodiment 2, the same reference numerals are given to configuration elements having the same operations as those of Exemplary embodiment 1 and the description thereof will be omitted.

Exemplary embodiment 2 is constituted as display device 81 in which contact input type input device 25 is provided on a back surface of protruding plate 1 in addition to the configuration of resin component 31 of display device 80 of Exemplary embodiment 1. Light sources 14a, 14b, and 14c are substitute members of light source 10.

Input device 25 is constituted of light sources 14a, 14b, and 14c, and board 15, and detects a contact or approach of a finger or the like to thin film layer 2 on a surface side of resin component 31 to detect an input operation.

Figure 2A:
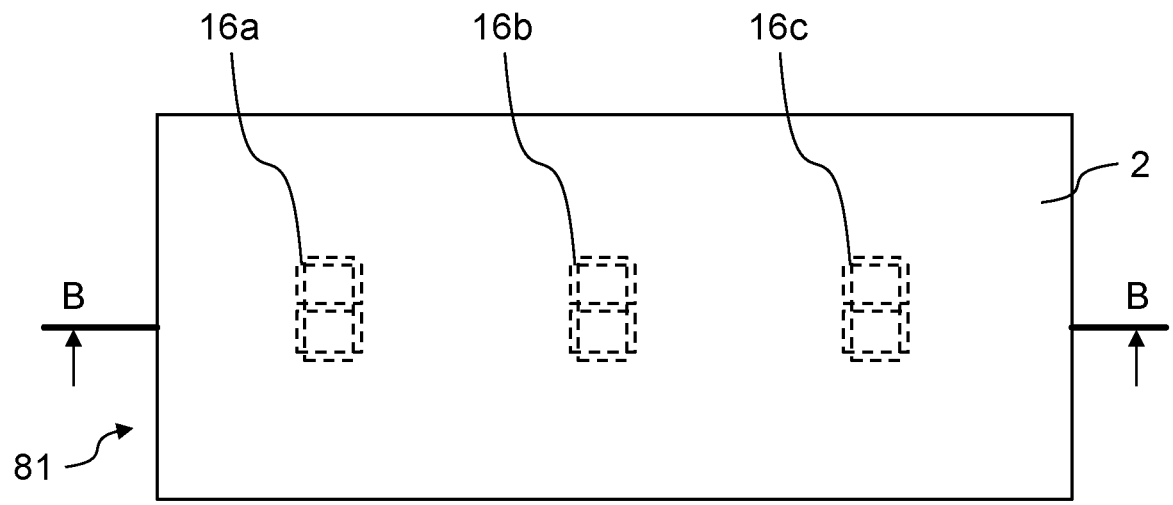
FIG. 2A is a front view of a display device including a resin component in Exemplary embodiment 2.
Figure 2B:
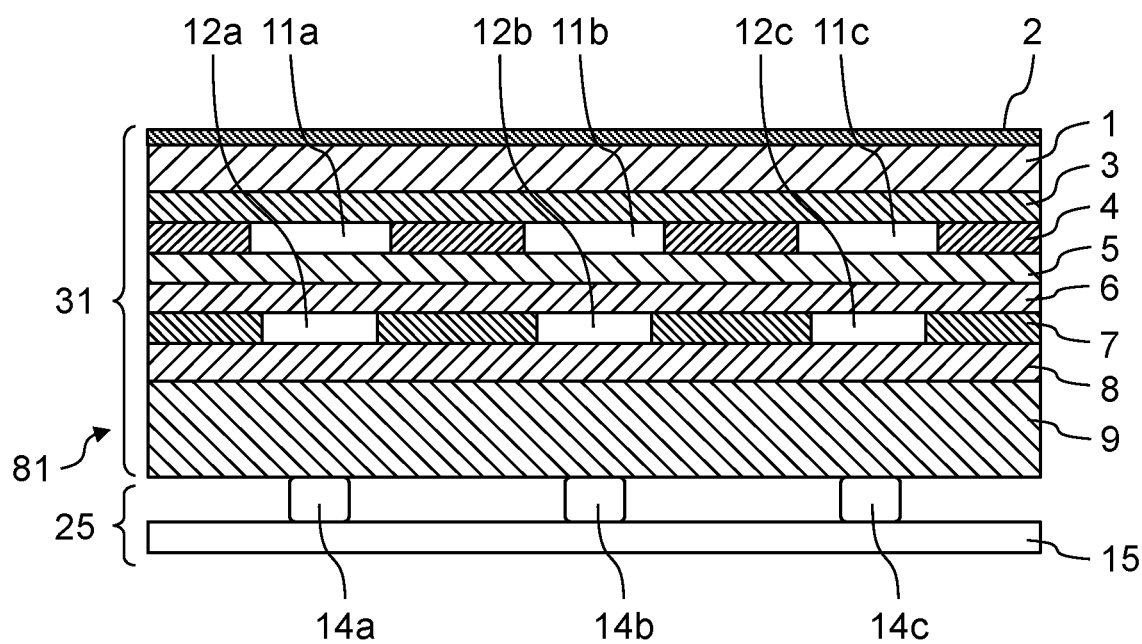
FIG. 2B is a sectional view that is taken along line B-B of FIG. 2A of the display device including the resin component in Exemplary embodiment 2.

In FIGS. 2A and 2B, as input device 25, board 15 on which light sources 14a, 14b, and 14c are mounted is disposed on a surface of reinforcing layer 9 on a side opposite to adhesive layer 8. Board 15 can be embedded in the surface of reinforcing layer 9 on adhesive layer 8 side or in inside of reinforcing layer 9, and can be freely designed according to a situation used by the user.

Light sources 14a, 14b, and 14c may be mounted at positions where the light can be transmitted through light transmitting portions 11a, 11b, and 11c of metallic concealing layer 4, and light transmitting portions 12a, 12b, and 12c of second concealing layer 7. That is, light sources 14a, 14b, and 14c are not necessarily mounted right under light transmitting portions 11a, 11b, and 11c of metallic concealing layer 4, and light transmitting portions 12a, 12b, and 12c of second concealing layer 7. For example, when light source 14a is turned on, light from light source 14a transmits reinforcing layer 9, adhesive layer 8, light transmitting portion 12a of second concealing layer 7, light color toning layer 6, light diffusion layer 5, light transmitting portion 11a of metallic concealing layer 4, transparent base material 3, protruding plate 1, and thin film layer 2, and mark 16a indicating a display region is displayed on a surface of thin film layer 2. Shapes of light transmitting portions 11a and 12a are displayed as the shape of mark 16a.

When light source 14b is turned on, light from light source 14b transmits reinforcing layer 9, adhesive layer 8, light transmitting portion 12b of second concealing layer 7, light color toning layer 6, light diffusion layer 5, light transmitting portion 11b of metallic concealing layer 4, transparent base material 3, protruding plate 1, and thin film layer 2, and mark 16b indicating a display region is displayed on the surface of thin film layer 2. Shapes of light transmitting portions 11b and 12b are displayed as the shape of mark 16b.

In addition, when light source 14c is turned on, light from light source 14c transmits reinforcing layer 9, adhesive layer 8, light transmitting portion 12c of second concealing layer 7, light color toning layer 6, light diffusion layer 5, light transmitting portion 11c of metallic concealing layer 4, transparent base material 3, protruding plate 1, and thin film layer 2, and mark 16c indicating a display region is displayed on the surface of thin film layer 2. Shapes of light transmitting portions 11c and 12c are displayed as the shape of mark 16c.

The design such as the shape, size, number, or display position of marks 16a, 16b, and 16c can be set in an arbitrary manner by the user. The display is not limited to marks 16a, 16b, and 16c, but a display format such as characters or numerals represented by 7 segments is also possible, and the user can set in an arbitrary manner.

As light sources 14a, 14b, and 14c, similar to Exemplary embodiment 1, light emitting diode chips of blue, red, and green (three primary colors of light) are embedded in a single package, so that color change or the like is easily controlled to express full color. As another example of light sources 14a, 14b, and 14c, other light sources other than the LED can be used as a backlight. Light sources 14a, 14b, and 14c can be embedded in the surface of reinforcing layer 9 on adhesive layer 8 side or in the inside of reinforcing layer 9, and can be freely designed according to a situation used by the user. It is also possible to perform finer color matching by combining the colors of the light of light sources 14a, 14b, and 14c, and the color tones of light color toning layer 6 and reinforcing layer 9.

As input device 25, for example, when a contact detecting type input device is used, in a case where the user comes into contact with the operation input unit displayed on the surface of thin film layer 2 with the finger, at least an electrode pattern along the operation input unit is required so that position coordinates where the finger of the user approaches can be detected.

Figure 2C:
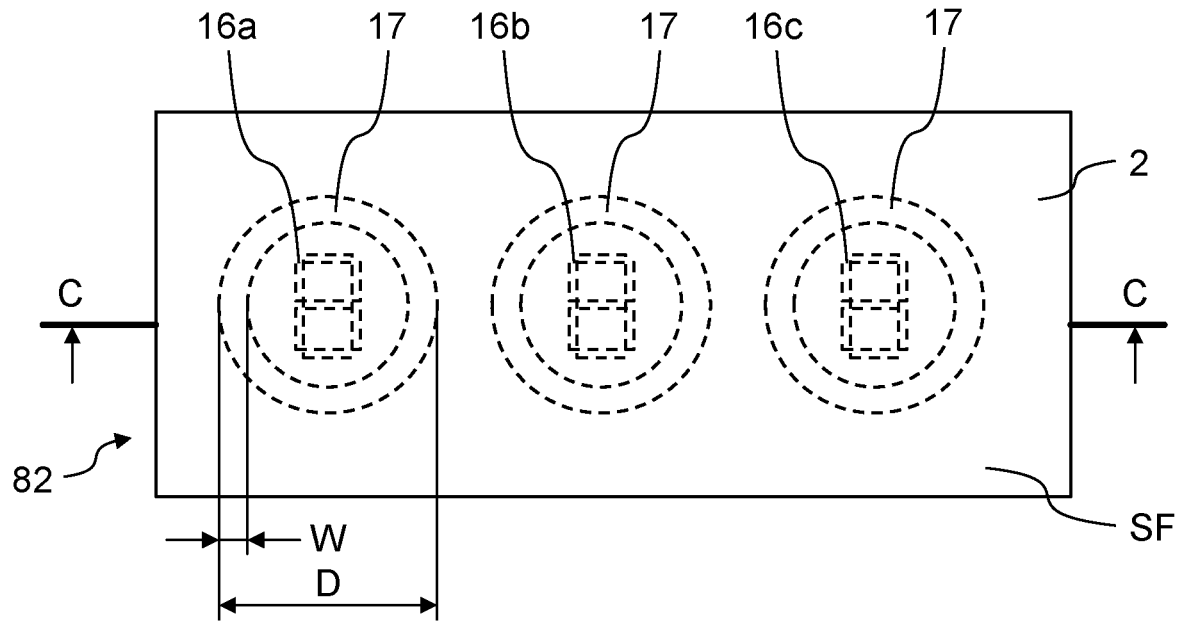
FIG. 2C is a front view of the display device including the resin component in Exemplary embodiment 2.
Figure 2D:
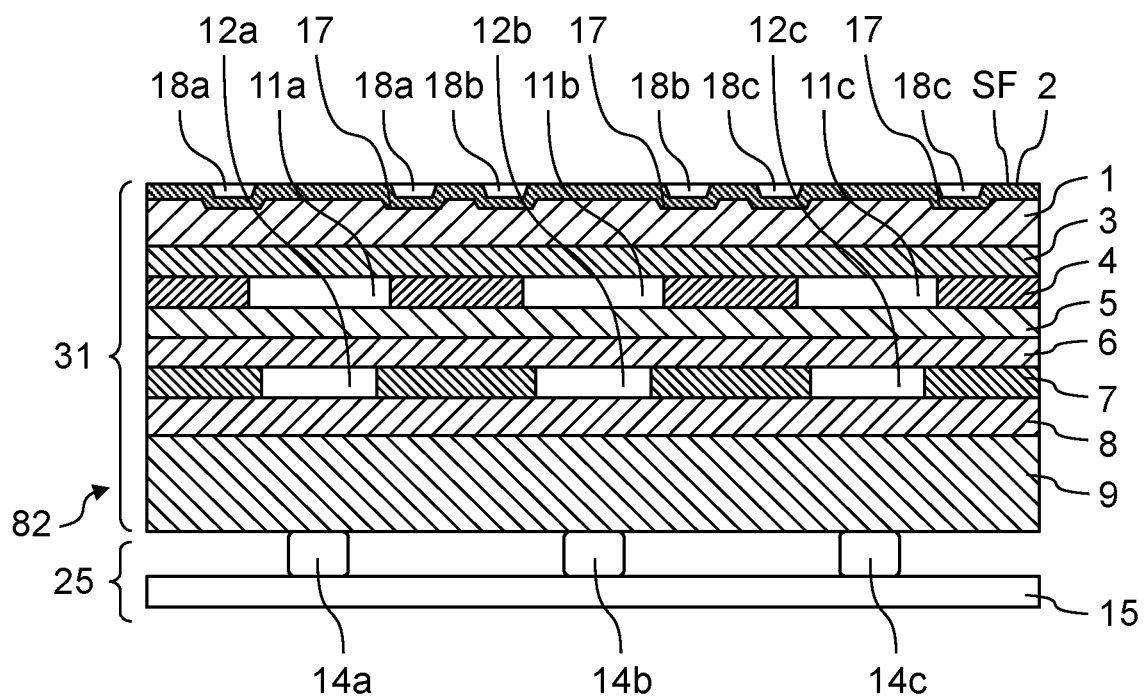
FIG. 2D is a sectional view that is taken along line C-C of FIG. 2C of the display device including the resin component in Exemplary embodiment 2.

Hereinafter, an example of the operation input unit will be described. In FIGS. 2C and 2D, as the operation input unit, annular recess portion grooves 17 are formed around marks 16a, 16b, and 16c. Recess portion grooves 17 are formed by shaping shapes of annular recess portions 18a, 18b, and 18c from above using a press or the like with respect to thin film layer 2 formed on the surface of protruding plate 1. Each material and light transmittance of thin film layer 2 and protruding plate 1 are the same as those of Exemplary embodiment 1.

With the configuration described above, the user operates the finger to move along annular recess portion groove 17 that is the operation input unit, so that the input operation by input device 25 can be detected by an amount by which the finger is moved.

In a case where the user operates the operation input unit with the finger, a depth of annular recess portion groove 17 from outermost surface SF of display device 82 is 1 mm or more and 20 mm or less, and width W of recess portion groove 17 is suitably 3 mm or more and 30 mm or less. Within the range, the user can freely design. In Exemplary embodiment 2, as an example, diameter D of recess portion groove 17 is 40 mm, width W of recess portion groove 17 is 8 mm, and the depth of recess portion groove 17 is 2 mm. When the depth of recess portion groove 17 is 1 mm or more, the user can easily feel the recess portion of recess portion groove 17. On the other hand, when the depth of recess portion groove 17 is 20 mm or more, it is too deep and it is difficult for the user to trace with the finger.

In Exemplary embodiment 2, recess portion groove 17 is provided in the annular shape, but not only an input of a rotation operation but also a slide type linear operation is possible by providing an annular recess portion groove or using an arcuate, or linear recess portion groove having an arbitrary length. Specifically, similar to the above description, the depth from outermost surface SF of display device 82 is 1 mm or more and 20 mm or less, and the width of the recess portion groove is 3 mm or more and 30 mm or less. Here, when the width of the recess portion groove is 3 mm or more, the user can also be traced with the fingertip, and when the width of the recess portion groove exceeds 30 mm, a bottom portion of the recess portion groove is regarded as a plane rather than the recess portion of the recess portion groove.

As described above, it is possible to improve operability to a place where the finger of the user is to slide in a contact state by providing recess portion groove 17. Furthermore, in Exemplary embodiment 2, it is possible to provide display device 82 having an expression that the display appears completely when the light source is turned on and gives a surprise to the user by constituting display device 82 by combining resin component 31 and contact detecting type input device 25, in addition to the improvement of designability of the surface of the protruding plate described in Exemplary embodiment 1.

Contact detecting type input device 25 may be any type of detection methods such as a capacitive method or a pressure sensitive method, as long as it can detect the contact of the finger with the touch panel.

With the configuration described above, the user operates the finger to slide along annular recess portion groove 17 which is the operation input unit of display devices 81 and 82, so that the input operation by input device 25 can be detected by the amount by which the finger is slid. As a result, for example, it is possible to increase or decrease an output sound volume, a temperature, or the like of a sound device. Further, display devices 81 and 82 are constituted by combining resin component 31 of display device 80 using the light described in Exemplary embodiment 1 and input device 25, so that it is possible to provide a user interface having excellent designability that only a part of the exterior portion of the household electric appliance, the interior of the automobile, or the like can be recognized when the light source is turned off, and input device 25 emitting light in an arbitrary shape appears when the light source is turned on.

Exemplary Embodiment 3

Figure 3A:
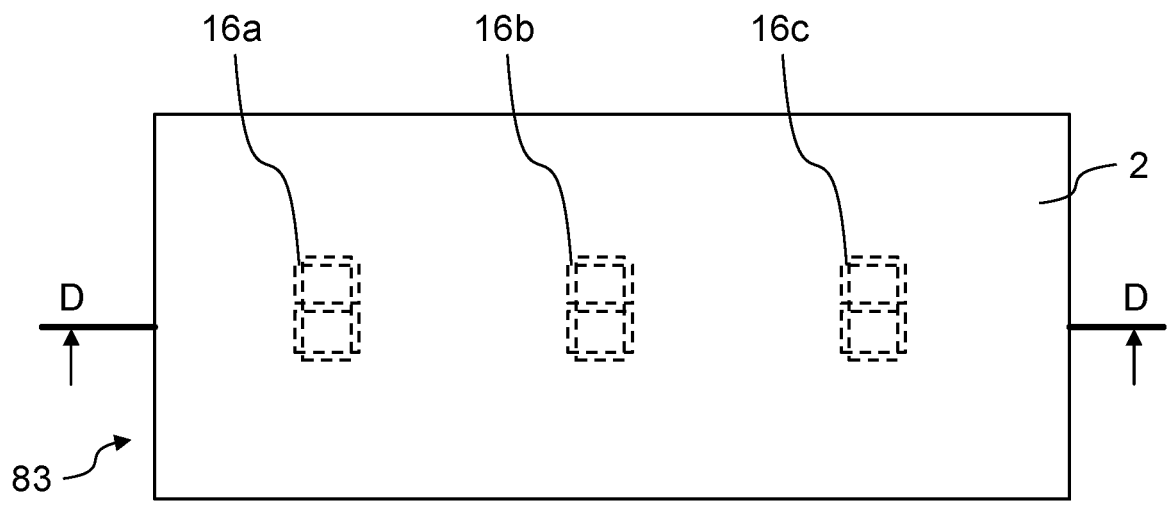
FIG. 3A is a front view of a display device including a resin component in Exemplary embodiment 3.
Figure 3B:
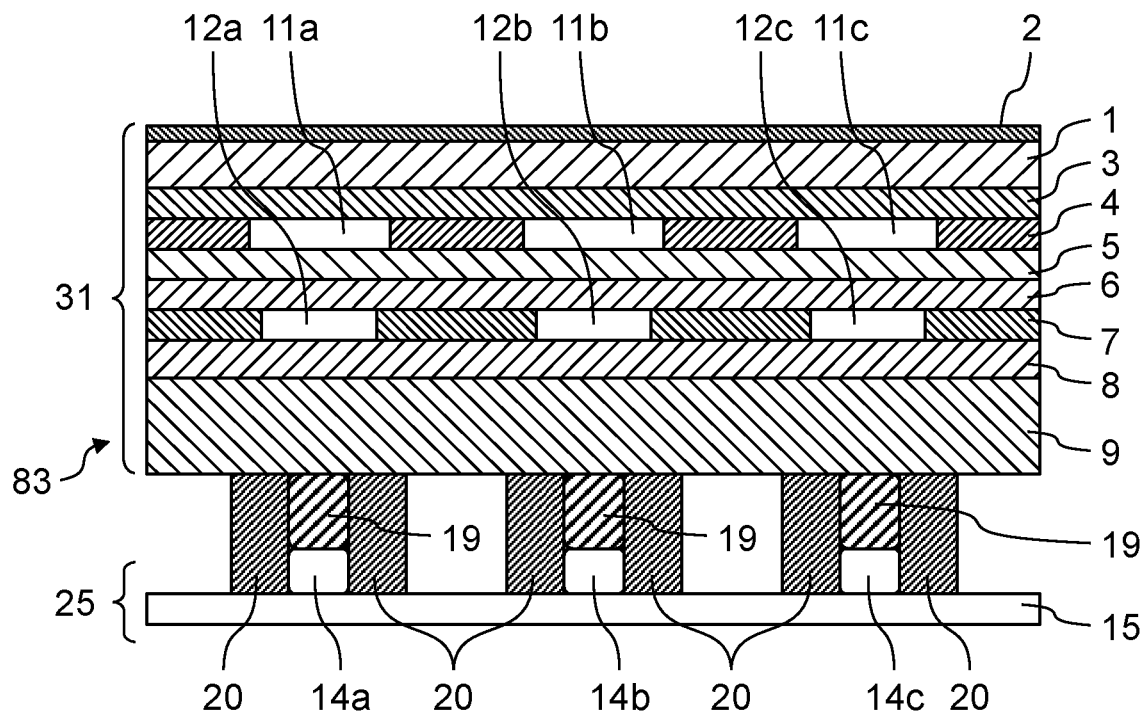
FIG. 3B is a sectional view that is taken along line D-D of FIG. 3A of the display device including the resin component in Exemplary embodiment 3.
Figure 4:
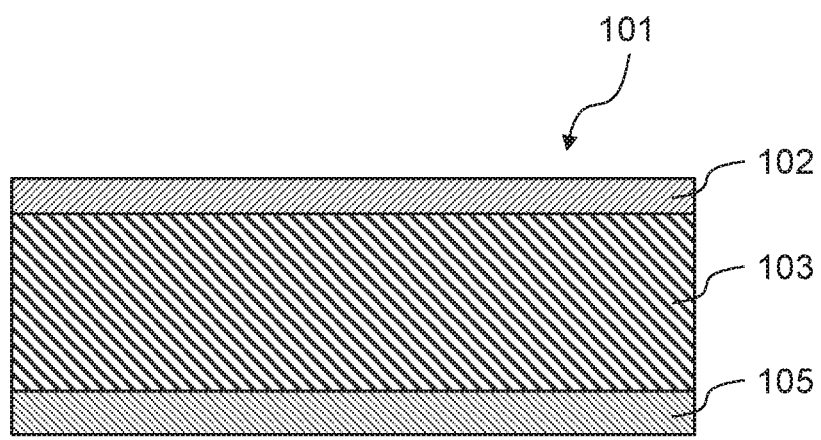
FIG. 4 is a sectional view of a wood decorative molded article of the related art.

FIGS. 3A and 3B illustrate display device 83 including resin component 31 of Exemplary embodiment 3 of the present disclosure.

In Exemplary embodiment 3, the same reference numerals are given to configuration elements having the same operations as those of Exemplary embodiment 1 and Exemplary embodiment 2, and the description thereof will be omitted.

In Exemplary embodiment 3, in addition to the configurations of Exemplary embodiment 1 and Exemplary embodiment 2, display device 83 is configured such that light guides 19 are disposed between light sources 14a, 14b, and 14c, and reinforcing layer 9, and peripheries of light sources 14a, 14b, and 14c, and light guides 19 are surrounded by light-shielding materials 20.

With these configurations, light from light sources 14a, 14b, and 14c can be efficiently transmitted to resin component 31, so that a decrease in luminance of the light when the light transmits each member can be reduced. That is, it is possible to increase a life span of light sources 14a, 14b, and 14c, or decrease power consumption, and reduce a heating amount.

In FIGS. 3A and 3B, light guides 19 are disposed between light sources 14a, 14b, and 14c, and reinforcing layer 9, and light-shielding materials surround peripheries thereof.

When light source 14a is turned on, light transmitting light guide 19 transmits reinforcing layer 9, adhesive layer 8, light transmitting portion 12a of second concealing layer 7, light color toning layer 6, light diffusion layer 5, light transmitting portion 11a of metallic concealing layer 4, transparent base material 3, protruding plate 1, and thin film layer 2, and mark 16a indicating a display region is displayed on a surface of thin film layer 2. Shapes of light transmitting portions 11a and 12a are displayed as the shape of mark 16a.

In addition, when light source 14b is turned on, light transmitting light guide 19 transmits reinforcing layer 9, adhesive layer 8, light transmitting portion 12b of second concealing layer 7, light color toning layer 6, light diffusion layer 5, light transmitting portion 11b of metallic concealing layer 4, transparent base material 3, protruding plate 1, and thin film layer 2, and mark 16b indicating a display region is displayed on the surface of thin film layer 2. Shapes of light transmitting portions 11b and 12b are displayed as the shape of mark 16b.

In addition, when light source 14c is turned on, light transmitting light guide 19 transmits reinforcing layer 9, adhesive layer 8, light transmitting portion 12c of second concealing layer 7, light color toning layer 6, light diffusion layer 5, light transmitting portion 11c of metallic concealing layer 4, transparent base material 3, protruding plate 1, and thin film layer 2, and mark 16c indicating a display region is displayed on the surface of thin film layer 2. Shapes of light transmitting portions 11c and 12c are displayed as the shape of mark 16c.

Therefore, with these configurations, light from light sources 14a, 14b, and 14c can be efficiently transmitted to resin component 31, so that a decrease in luminance of the light when the light transmits each member can be reduced.

The film thicknesses are as follows from thicker one.

The protruding plate>the transparent base material>the thin film layer>the concealing layer=the metallic concealing layer=the light diffusion layer>the light color toning layer In addition, the light transmittances are as follows from higher one.

The transparent base material=the thin film layer>the protruding plate>the light diffusion layer>the light color toning layer>the metallic concealing layer>the concealing layer There is an effect of improving the concealing property other than the light transmitting portion. That is, it is possible to prevent the color transparency of any member or layer disposed on the back surface of protruding plate 1 onto the surface of protruding plate 1 when the light source is turned off, and to display a clear outline with less blurring when the light source is turned on. Similar to Exemplary embodiment 2, also in Exemplary embodiment 3, it is possible to constitute display device 83 by combining resin component 31 and contact detecting type input device 25.

According to the configurations of Exemplary embodiments 1 to 3, in a state where the surface of protruding plate 1 is visually recognized only by the external light, since the color transparency to the surface of protruding plate 1 by second concealing layer 7 and light color toning layer 6 is suppressed by metallic concealing layer 4, only the color tone or the wood grain derived from protruding plate 1 can be visually recognized. On the other hand, in a state where light is transmitted through the back surface of protruding plate 1 and the surface of protruding plate 1 is visually recognized by the external light, the light transmits light transmitting portions 12a, 12b, and 12c of second concealing layer 7, and light transmitting portions 11a, 11b, and 11c of metallic concealing layer 4. Therefore, the light display of an arbitrary character, mark, or pattern of the same shape as that of the transmitting portion can be visually recognized on the surface of protruding plate 1, metallic concealing layer 4 and second concealing layer 7 other than the display do not transmit light from the back surface to the surface of protruding plate 1, and only the color tone or the wood grain derived from protruding plate 1 can be visually recognized similar to the state where the surface of protruding plate 1 is visually recognized by the external light.

Furthermore, as described above, since the light transmission is suppressed in portions other than the light transmitting portion, it is possible to provide a display device with transmitted light in which an outline with less blurring is clearly expressed in detail. In addition, since light transmits light color toning layer 6 and light diffusion layer 5 in the configuration, it is possible to provide a display device having a color desired by the user on the surface of protruding plate 1 and uniformly emitting light.

Embodiments or modification examples of the above-described various Exemplary embodiments or modification examples are suitably combined, so that it is possible to achieve the respective effects possessed by them. Combinations of the Exemplary embodiments, combinations of the examples, or combinations of the Exemplary embodiments and the examples are possible, and combinations of features in different embodiments or examples are also possible.

As described above, according to the present disclosure, when the light source is turned off, the color tone of the layer constituted on the back surface of the protruding plate is not color-transparent on the surface of the protruding plate, and only the wood grain or the color tone of the protruding plate itself can be visually recognized. In addition, when the light source is turned on, the light in which an arbitrary character, mark, or the like is displayed on a part of the surface of the protruding plate can be visually recognized. Therefore, it is possible to provide a display device using the protruding plate which enables production of light expression having excellent designability.

That is, according to the present disclosure, in a state where the first surface of the protruding plate is visually recognized only by the external light, since the color transparency to the first surface of the protruding plate by the concealing layer and the light color toning layer is suppressed by the metallic concealing layer, only the color tone or the wood grain derived from the protruding plate can be visually recognized. On the other hand, in a state where light is transmitted from the second surface of the protruding plate and the first surface of the protruding plate is visually recognized by the external light, since the light transmits the transmitting portion of the concealing layer and the transmitting portion of the metallic concealing layer, the light display of an arbitrary character, mark, or pattern of the same shape as the transmitting portion can be visually recognized on the first surface of the protruding plate. Furthermore, the metallic concealing layer and the concealing layer other than the display do not transmit light from the second surface to the first surface of the protruding plate, and only the color tone or the wood grain derived from the protruding plate similar to a state where the first surface of the protruding plate is visually recognized by the external light can be visually recognized.

In addition, since the light transmission is suppressed in portions other than the light transmitting portion, it is possible to provide a display device with transmitted light in which an outline with less blurring is clearly expressed in detail. In addition, since light transmits the light color toning layer and the light diffusion layer in the configuration, it is possible to provide a display device having a color desired by the user on the first surface of the protruding plate and uniformly emitting light.

In the display device using the protruding plate of the present disclosure, a texture of the protruding plate itself can be visually recognized when the light source is turned off. On the other hand, when the light source is turned on, a display having a color of the light desired by the user and embossing a character, a mark, or the like of a clear outline with less blurring can be provided. Therefore, it is possible to provide a decorating technique by lighting of the protruding plate having excellent designability, thereby contributing to higher function and higher design of the exteriors of various household electric products, the interior of the automobile, or the like.

What is claimed is:

1. A display device including a protruding plate, comprising:
    the protruding plate that has a first surface and a second surface on a side opposite to the first surface, and is made of natural wood;
    a thin film layer that is disposed on the first surface of the protruding plate;
    a transparent base material;
    a first concealing layer;
    a light diffusion layer;
    a light color toning layer; and
    a second concealing layer,
    the transparent base material, the first concealing layer, the light diffusion layer, the light color toning layer, and the second concealing layer being disposed on a side of the second surface of the protruding plate,
    wherein the first concealing layer has a dispositional relationship in which the first concealing layer is disposed closer to the protruding plate than the second concealing layer and the light color toning layer to the protruding plate,
    wherein the transparent base material, the first concealing layer, the light diffusion layer, the light color toning layer, and the second concealing layer are disposed in an arbitrary order except for the dispositional relationship,
    wherein the protruding plate has a greater thickness than the transparent base material, the transparent base material has a greater thickness than the thin film layer, and the thin film layer has a greater thickness than the second concealing layer,
    wherein the second concealing layer, the first concealing layer, and the light diffusion layer have a same thickness,
    wherein the light diffusion layer is thicker than the light color toning layer, and
    wherein in light transmittance measured when light from a light source is radiated from the side of the second surface to a side of the first surface of the protruding plate,
    the transparent base material and the thin film layer have a same light transmittance, and
    the thin film layer has a higher light transmittance than the protruding plate, the protruding plate has a higher light transmittance than the light diffusion layer, the light diffusion layer has a higher light transmittance than the light color toning layer, the light color toning layer has a higher light transmittance than the first concealing layer, and the first concealing layer has a higher light transmittance than the second concealing layer.

2. The display device including the protruding plate of claim 1, further comprising:
    the light source that radiates the light from the side of the second surface to the side of the first surface of the protruding plate,
    wherein the first concealing layer has a first light transmitting portion in a shape of a character, a mark, or a pattern,
    wherein the second concealing layer has a second light transmitting portion in a shape of a character, a mark, or a pattern,
    wherein the first light transmitting portion is located at a same position as the second light transmitting portion as viewed from the side of the first surface of the protruding plate,
    wherein when the light of the light source is radiated from the side of the second surface to the side of the first surface of the protruding plate, the light is transmitted through only the first light transmitting portion of the first concealing layer and the second light transmitting portion of the second concealing layer, and
    wherein an outer periphery of the first light transmitting portion is larger than an outer periphery of the second light transmitting portion.

3. The display device including the protruding plate of claim 2,
    wherein in the protruding plate, in a state where the first surface of the protruding plate is visually recognized by external light without emitting light from the side of the second surface of the protruding plate, only a color tone or a wood grain derived from the protruding plate is capable of being visually recognized, and
    wherein in a state where the light is emitted from the side of the second surface of the protruding plate and the first surface of the protruding plate is visually recognized by external light, the light is transmitted through only the first light transmitting portion of the first concealing layer and the second light transmitting portion of the second concealing layer, so that display of a character, a mark, or a pattern of a same shape as the first light transmitting portion and the second light transmitting portion is capable of being visually recognized on the first surface of the protruding plate, and only the color tone or the wood grain derived from the protruding plate is capable of being visually recognized at portions other than the display similar to the state where the first surface of the protruding plate is visually recognized by the external light without emitting the light from the side of the second surface of the protruding plate.

4. The display device including the protruding plate of claim 2, further comprising:
a transparent light guide having a light-transmitting property which is disposed between the second surface of the protruding plate and the light source,
wherein shapes of the first light transmitting portion of the first concealing layer and the second light transmitting portion of the second concealing layer are displayed on the first surface of the protruding plate by the light transmitted from the light guide.

5. The display device including the protruding plate of claim 4, wherein the light guide is colored.

6. The display device including the protruding plate of claim 1, wherein an inside of the protruding plate is impregnated with an organic resin having a molecular weight of 100 or more and 50,000 or less.

7. The display device including the protruding plate of claim 6, wherein an inside of the protruding plate is impregnated with a pigment, a dye, or a flame retardant.

8. The display device including the protruding plate of claim 1,
wherein the thickness of the protruding plate is 0.1 mm or more and 0.6 mm or less,
wherein the thickness of the thin film layer is 5 μm or more and 50 μm or less,
wherein the thickness of the transparent base material is 20 μm or more and 200 μm or less,
wherein the thickness of each of the second concealing layer, the first concealing layer, and the light diffusion layer is 3.5 μm or more, and
wherein the thickness of the light color toning layer is less than 3.5 μm.

9. The display device including the protruding plate of claim 1,
wherein when the light is transmitted through the protruding plate, in a case where a white LED light source is used as the light source for a color of the light that is capable of being visually recognized on the first surface of the protruding plate,
in chromaticity values X and Y in an X and Y chromaticity diagram of the light color toning layer for extracting white light, X is 0.2800 or more and less than 0.3300, and Y is 0.2800 or more and less than 0.3300,
in chromaticity values X and Y in an X and Y chromaticity diagram of the light color toning layer for extracting blue light, X is 0.1700 or more and less than 0.2300, and Y is 0.0190 or more and less than 0.2310,
in chromaticity values X and Y in an X and Y chromaticity diagram of the light color toning layer for extracting green light, X is 0.1290 or more and less than 0.3510, and Y is 0.4970 or more and less than 0.6400, and
in chromaticity values X and Y in an X and Y chromaticity diagram of the light color toning layer for extracting red light, X is 0.4800 or more and less than 0.5600, and Y is 0.2900 or more and less than 0.3270.

10. The display device including the protruding plate of claim 1, further comprising:
an adhesive layer on a surface of the second concealing layer on a side opposite to the protruding plate,
wherein a back surface of the adhesive layer is provided with a transparent reinforcing layer having a light-transmitting property.

11. The display device including the protruding plate of claim 1, further comprising:
a contact detecting type input device on the side of the second surface of the protruding plate.

12. The display device including the protruding plate of claim 11,
wherein an annular, arcuate, or linear recess portion groove is provided on the first surface of the protruding plate, and
wherein the input device includes an operation input unit having an electrode pattern for detecting coordinates where a finger of a user approaches along the recess portion groove.

13. The display device including the protruding plate of claim 12,
wherein a depth of the recess portion groove is 1 mm or more and 20 mm or less, and
wherein a width of the recess portion groove is 3 mm or more and 30 mm or less.

* * * * *